(12) United States Patent
Tyrer et al.

(10) Patent No.: US 6,471,281 B1
(45) Date of Patent: Oct. 29, 2002

(54) GOLF CART CANOPY AND BAG SUPPORT BRACKET

(76) Inventors: Stephen Edward Tyrer, 147 Taft Crescent, Centerport, NY (US) 11721; Richard Kenneth Harris, 2395 Hay Creek Dr., Pinckney, MI (US) 48169

( * ) Notice: Subject to any disclaimer, the term of this patent is extended or adjusted under 35 U.S.C. 154(b) by 0 days.

(21) Appl. No.: 09/851,628

(22) Filed: May 9, 2001

(51) Int. Cl.[7] .................................................. B60P 7/02
(52) U.S. Cl. .............................. 296/100.11; 296/77.1; 280/DIG. 5
(58) Field of Search .................... 296/100.11, 100.16, 296/100.15, 77.1, 99.1, 102, 186, 100.01, 136; 280/DIG. 5, 288.4; 135/88; 340/568.6; 206/315.4; 248/316.2

(56) References Cited

U.S. PATENT DOCUMENTS

| | | | | |
|---|---|---|---|---|
| 4,334,692 A | * | 6/1982 | Lynch | 280/288.4 |
| 4,355,746 A | * | 10/1982 | Casady | 211/100 |
| 4,533,013 A | * | 8/1985 | Hightower | 280/DIG. 5 |
| 4,830,037 A | * | 5/1989 | Held | 280/DIG. 5 |
| 5,031,713 A | * | 7/1991 | Criscuolo | 280/DIG. 5 |
| 5,041,815 A | * | 8/1991 | Newton | 340/568.6 |
| 5,069,481 A | * | 12/1991 | Strange | 280/DIG. 5 |
| 5,088,635 A | * | 2/1992 | Taylor et al. | 280/DIG. 5 |
| 5,094,500 A | * | 3/1992 | Maypole et al. | 280/DIG. 5 |
| D326,831 S | * | 6/1992 | Lanius et al. | 296/186 |
| 5,190,340 A | | 3/1993 | Nuscher | |
| 5,310,235 A | * | 5/1994 | Seymour et al. | 280/DIG. 5 |
| 5,388,881 A | * | 2/1995 | Spencer et al. | 296/77.1 |
| 5,582,043 A | * | 12/1996 | McCue et al. | 206/315.4 |
| 5,588,690 A | * | 12/1996 | Showalter | 296/100.11 |
| 5,688,018 A | | 11/1997 | Simpson | |
| 5,741,041 A | * | 4/1998 | Sullivan | 296/100.16 |
| 5,762,308 A | * | 6/1998 | Bryan | 248/316.2 |
| 5,927,519 A | * | 7/1999 | Koonts et al. | 211/104 |
| 6,007,134 A | * | 12/1999 | Weston | 280/DIG. 5 |
| 6,068,325 A | * | 5/2000 | Hughes | 280/DIG. 5 |
| D432,460 S | * | 10/2000 | Huang | 296/186 |
| 6,216,714 B1 | * | 4/2001 | Tucker | 280/DIG. 5 |
| 6,227,217 B1 | * | 5/2001 | Peta | 296/77.1 |
| 6,227,427 B1 | * | 5/2001 | Kunz | 206/315.3 |
| 6,227,603 B1 | * | 5/2001 | Brock | 296/100.01 |
| 2002/0017803 A1 | * | 2/2002 | Dolan et al. | 296/136 |

FOREIGN PATENT DOCUMENTS

| | | | |
|---|---|---|---|
| JP | 10146408 | * | 6/1998 |
| JP | 10203406 | * | 8/1998 |
| JP | 11216215 | * | 8/1999 |
| JP | 200051419 | * | 2/2000 |
| JP | 2001122169 | * | 5/2001 |
| JP | 2001129138 | * | 5/2001 |
| JP | 2001171363 | * | 6/2001 |

* cited by examiner

*Primary Examiner*—Kiran Patel
(74) *Attorney, Agent, or Firm*—Michael T. York

(57) ABSTRACT

A bracket assembly for supporting golf bags on a golf cart and for supporting a rearwardly extending canopy assembly having a canopy and a canopy frame structure. The golf cart having a body, a frame supporting the body, a seating compartment and a golf bag compartment located rearwardly of the seating compartment. The bracket assembly including at least one support member, a mounting mechanism to mount the support member to the cart's frame and a strap for securing the upper portion of golf bags resting in the golf bag storage compartment. In addition, the bracket assembly includes a pivotal joint for pivotally connecting the canopy frame structure to the support member to enable the canopy to be extended to cover the golf bags or folded out of the way to provide access to the golf bags.

22 Claims, 11 Drawing Sheets

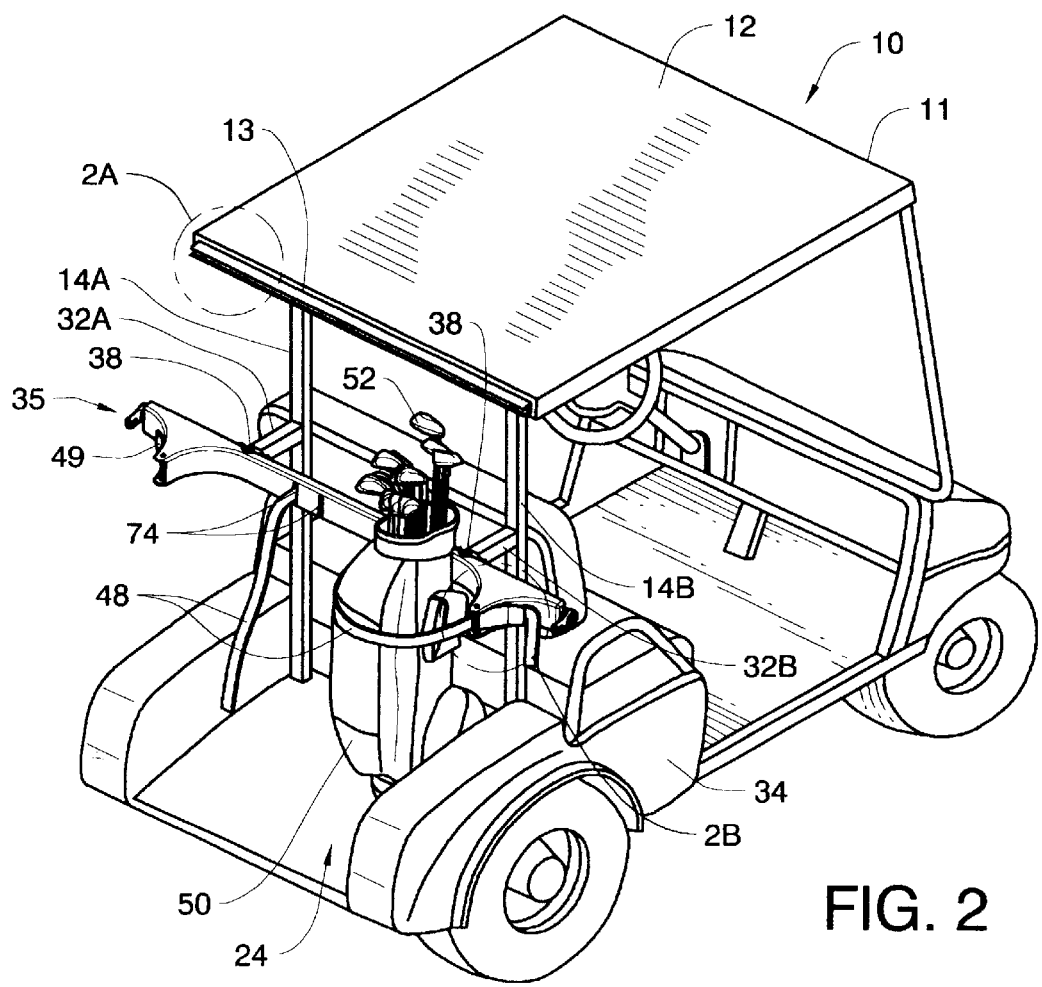
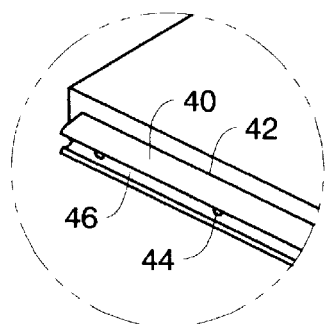
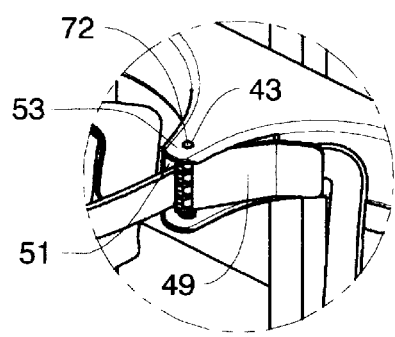
FIG. 2
FIG. 2A
FIG. 2B

GOLF CART CANOPY AND BAG SUPPORT BRACKET

FIELD OF THE INVENTION

This invention relates generally to the field of retractable golf cart canopy covers for protecting stored golf bags from rain and golf bag support brackets that support the golf bags, specifically to an integrated canopy cover support bracket and golf bag support bracket.

DESCRIPTION OF THE RELATED ART

Canopy covers in the past have been utilized to protect golf bags and clubs located in the rear bag storage compartment of golf carts from rain and damp weather conditions. It is well-known in the sport that wet golf club grips can hinder the performance of the player and is undesirable. Additionally, the golf cart is equipped with a golf bag support bracket that contains straps to secure the golf bags within the cart in an upright position to prevent the bags from tipping over during travel.

Generally, retractable canopy covers attach to the back of the cart's top and to the cart's frame. The connection to the top is typically made with an extruded channel member that accepts the top edge of the canopy. The connection to the cart's frame is made using a structural base member that serves as a mounting base for a frame supporting the canopy. The base member generally attaches directly to the frame of the cart. A separate golf bag support bracket is also mounted to the cart's frame and is used to support the upper portion of the golf bags to prevent them from tipping over. The support bracket generally has straps attached to it to allow the player to surround the top of their bag with the strap to secure the bag to the support bracket. In this way, the player can drive the cart without the golf bag tipping over.

An example of a canopy cover to protect golf bags and clubs is U.S. Pat. No. 4,830,037 to William T. Held. This canopy cover discloses a cover that includes a channel that attaches to the back of the cart's top, base support members that attach to the frame of the cart supporting the top of the cart and a canopy frame structure that supports the flexible canopy and is pivotally attached to the base member. The base support members do not offer any golf bag support. Therefore, the cart is required to have a separate golf bag support bracket with straps to secure the top of the bag to the strap. This necessitates the need to fasten both of the support members to the cart's frame.

Another example of a cover to protect golf bags and clubs is U.S. Pat. No. 5,190,340 to Edwin H. Nuscher. This patent discloses a cover that includes a L-shaped top extending rearwardly from the top of the golf cart. In this patent the cover is supported by L-shaped support bars that attach to the top assembly of the cart. The cover is substantially elevated above the top of the cart to allow access to the golf clubs in the golf bags. However, one can easily see that this type of cover has several key disadvantages. The substantial elevation of the cover above the cart's top would severely limit the cart's usage in heavily wooded areas where it is desirable for the cart to travel under low tree branches. The branches could collide into the described cover causing damage to both the cover and the tree. Additionally, wind could easily carry rain on an angle from the sides of the cover into the bag storage area, getting the golf bags and clubs wet. The L-shaped cover would also slow the cart's mobility when traveling against the wind since the cover has a large face that is not aerodynamic. The support bars used to mount the L-shaped cover do not offer any golf bag support. Therefore, the cart is required to have a separate golf bag support bracket with straps to secure the top of the bag to the strap. This necessitates the need to fasten both of the support bars and the support bracket to the cart's frame. The L-shaped roof is also not aesthetically pleasing to the eye, making its marketability questionable.

Another example of a cover to protect golf bags and clubs is U.S. Pat. No. 6,068,325 to Charles A Hughes. This patent discloses a cover that includes four panels that are sewn together along their edges to form a large, rectangularly-shaped box that is secured to the frame of the cart that supports the roof and to the back of the roof covering the seating compartment The back panel of this cover also contains a bag for storing the back panel after it has been folded up. However, this type of cover has a number of disadvantages. To access the covered clubs the player is forced to unhook two hook and loop straps and roll the wet cover up. This is far from convenient and would likely result in the player and. possibly the clubs getting wet from the wet cover. The procedure is also slow requiring a significant amount of time. The player must unhook the cover, roll it up and let the cover back down while the player hits the ball. The procedure has to be repeated to return the club back into the golf bag. Additionally, the cover would not provide sufficient support for the heavy golf bags resulting in the bags being unstable while the cart is traveling.

Another example of a roll-up type cover to protect golf bags and clubs is U.S. Pat. No. 5,741,041 to Diane Sullivan. This patent discloses a roll-up type cover that utilizes a shock cord to attach the bottom of the cover to the cart and hooks to attach the top of the cover to the back edge of the cart's top. This cover has similar disadvantages as U.S. Pat. No. 6,068,325 in that the player must bend over and unhook two shock cord hooks that extend from the bottom edge of the cover to allow the player to roll the cover up. Again, it is likely that the player will get wet during this procedure and it is time consuming. Additionally, the cover lacks a structural frame making it sloppy looking and not aesthetically pleasing. It is also clear to see that the cover would not provide sufficient support of the golf bags making them unstable during travel.

Another example of a roll-up cover to protect golf bags and clubs is U.S. Pat. No. 5,688,018 to John Albert Simpson. This patent discloses another roll-up-type cover similar to U.S. Pat. No. 5,741,041 and shares the same disadvantages.

BRIEF SUMMARY OF THE INVENTION

The present invention provides a canopy attachment and bag support bracket assembly for attachment onto a golf cart. The canopy extends from the rear of the cart to protect golf bags and clubs located in the back of the cart from rain and the bag support bracket supports the golf bags to prevent them from tipping over.

It is to be understood that both the preceding summary and the following detailed description are intended to be exemplary and explanatory and are intended to provide a further explanation of the invention claimed. The invention will best be understood by reference to the following detailed description read in conjunction with the accompanying drawings.

OBJECTS AND ADVANTAGES OF INVENTION

Accordingly, several objects and advantages of the present invention are:

(a) to provide a bracket assembly that will allow the attachment of a canopy cover that protects the golf bags in the rear of the cart from rain and will also secure the tops of golf bags, preventing them from tipping over;

(b) to provide a bracket assembly that is less expensive to manufacture than producing a separate canopy mount bracket and golf bag support bracket;

(c) to provide a bracket assembly for mounting a rearwardly extending canopy and supporting the tops of the golf bags that is robust and durable;

(d) to provide a bracket assembly for mounting a rearwardly extending canopy and for supporting the tops of golf bags that has substantially fewer parts as compared to having separate brackets to perform both of these functions;

(e) to provide a bracket assembly that serves as a mount for a rearwardly extending canopy cover and also as a golf bag support bracket that will enable the canopy's frame to be folded up;

(f) to provide a bracket assembly that serves as a mount for a rearwardly extending canopy cover and also as a golf bag support bracket that is comparable in cost to conventionally known bag support brackets; and (g) to provide a bracket assembly that serves as a mount for a rearwardly extending canopy cover and also as a golf bag support bracket that will provide a pivotal attachment point of the canopy struts to enable the canopy to be rapidly extended to protect the bag storage area from rainfall and just as rapidly folded up to allow access to the bag storage area.

BRIEF DESCRIPTION OF SEVERAL VIEWS OF THE DRAWINGS

These and other advantages of the present invention will become more fully apparent as the following description is read in conjunction with the drawings, wherein:

FIG. 2 is a rear perspective view of the golf cart with the invention, a bracket assembly, mounted onto the cart's frame;

DETAILED DESCRIPTION OF THE PREFERRED EMBODIMENT(S)

Figure 1:
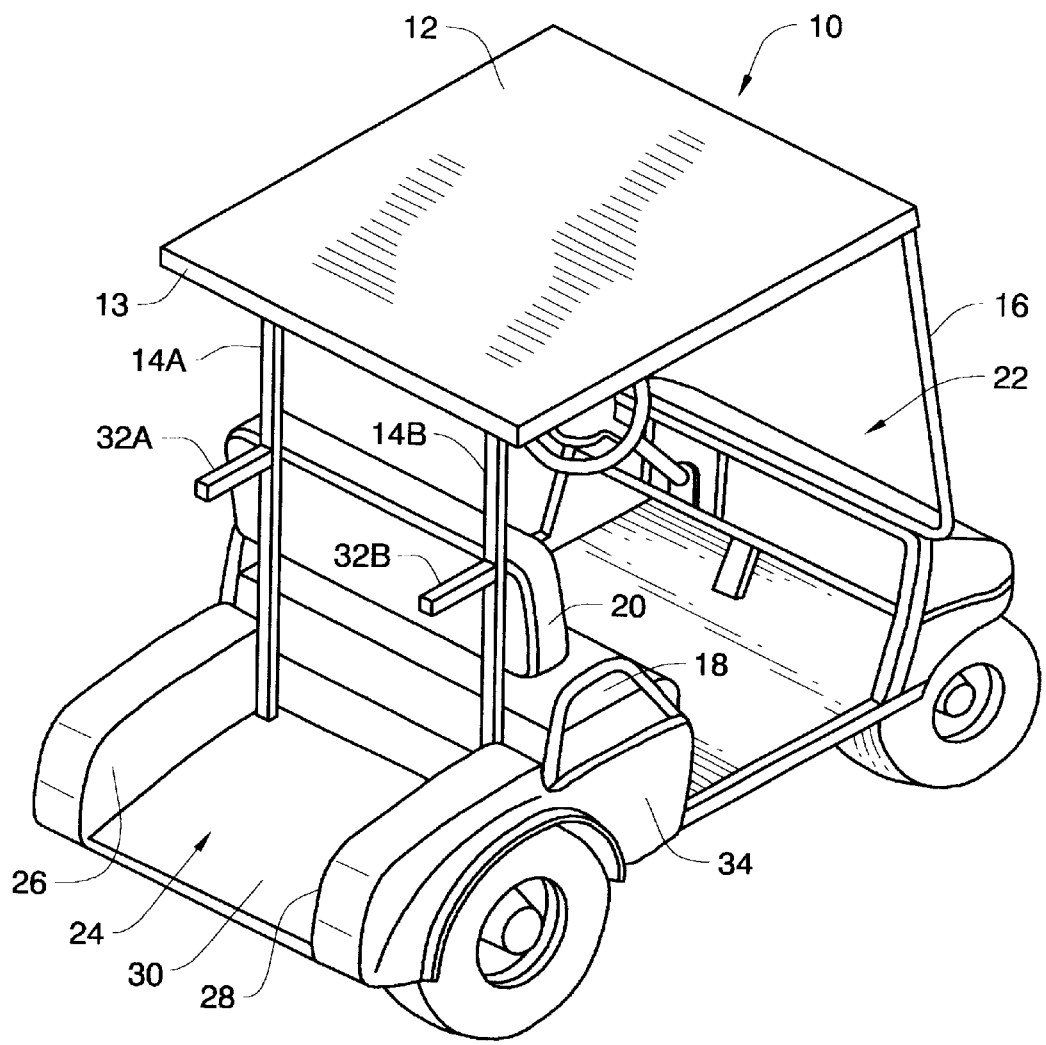
FIG. 1 is a rear perspective view of a golf cart in which an embodiment of the present invention may be used.

FIG. 1 shows a perspective view of a motorized golf cart 10 to which an embodiment of the present invention, generally indicated as a bracket assembly 35 in FIG. 2, can be attached. Cart 10 has a top 12 that is attached to the upper ends of rear frame members 14A and 14B and the upper portion of a front frame member 16 using fasteners (not shown). Top 12 is preferably a molded plastic part and is used to protect passengers sitting in a passenger compartment 22 from rain. The passengers sit on a seat 18 with their back resting on a seat back 20. Behind seat back 20 is a bag storage area 24 formed into a body 34 of cart 10. Storage area 24 is defined by a bottom 30, two opposing sides 26, 28 and seat back 20.

Top 12, shown in FIG. 2, has a front edge 11 and a rear edge 13 and is located above passenger compartment 22. The top does not cover the bag storage area to allow the player to remove golf clubs 52 from a golf bag 50 without hitting the golf clubs on the underside of top 12 while trying to lift the golf clubs out of the golf bag. Therefore, the bag storage area and the golf bag are exposed to rainfall. In order to protect bag storage area 24, it is desirable to have a cover that can be folded out of the way so that the player may remove the golf clubs without being hindered by a covering directly above golf bag 50.

Figure 4:
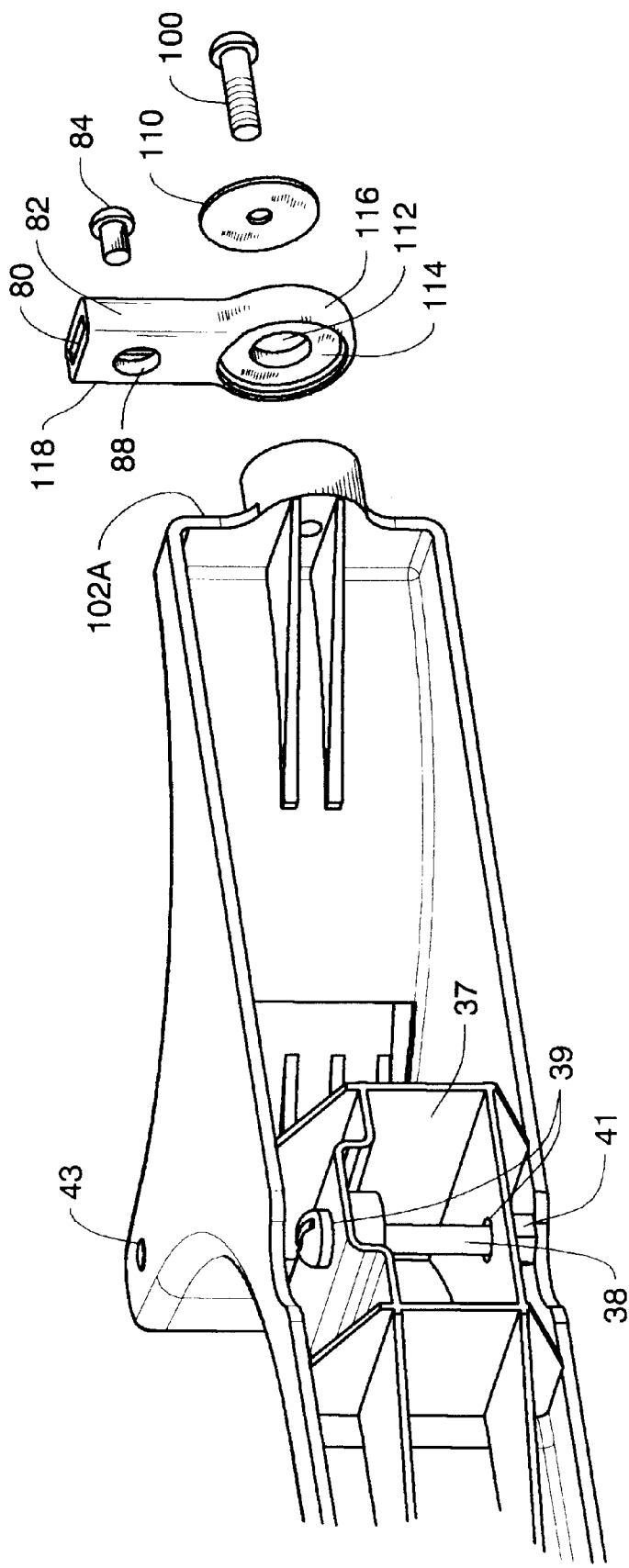
FIG. 4 is a partial front perspective view of the invention with the pivot arm and associated hardware exploded, the canopy and cart are eliminated for clarity.
Figure 5:
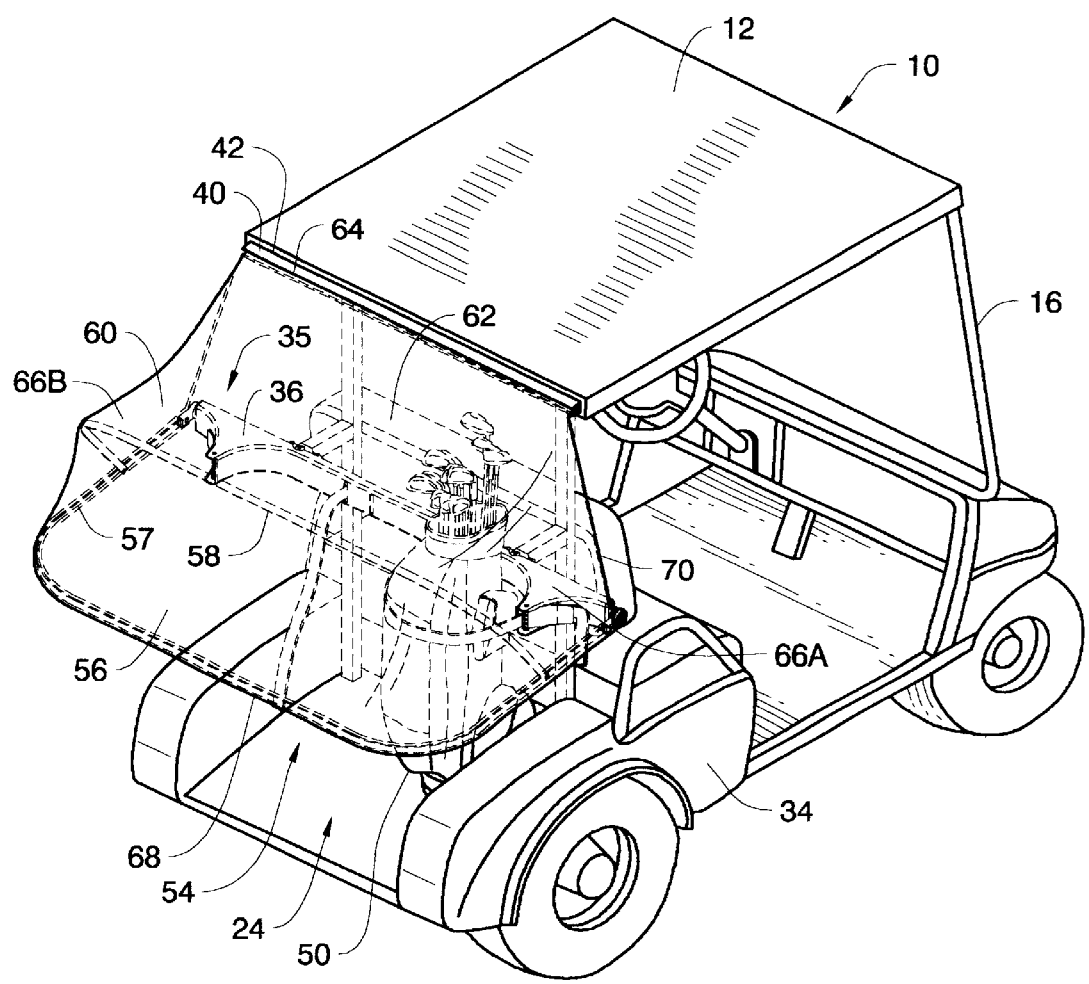
FIG. 5 is a rear perspective view of the golf cart with an embodiment of the present invention, a bracket assembly, attached to the cart supporting a canopy.

FIGS. 2, 2A and 2B show the components necessary to mount a foldable canopy assembly 54, shown in FIG. 5, to cart 10. Bracket assembly 35 has mounting features such as two rectangularly-shaped mount pockets 37, shown in FIG. 3, that are sized to receive frame extensions 32A and 32B. The frame extensions slide into the mount pockets. The bracket assembly is secured to the frame extensions using fasteners, such as bolts 38 passing through bolt holes 39 in a support member 36 and continues through holes in the frame extensions (not shown). Nuts 41 are threaded onto each corresponding end of each bolt 38, as can be seen in FIG. 4. It should be understood that the bracket assembly could be mounted to the frame extensions using flanges, stamped steel brackets or other types of mounting features connected to the bracket assembly. Frame extensions 32A and 32B are welded, bolted or otherwise connected to rear frame members 14A and 14B or, as an alternative, can be attached to the cart's body. Bracket assembly 35 includes an elongated support member 36, molded plastic pivot arms 82 that are pivotally attached to the ends of support member 36 forming a type of pivotal attachment mechanism, coupling members like straps 48 and levers 49 that are pivotally mounted to support member 36. Lever 49 has a planar body that has a round protrusion 72 on both the top and bottom surfaces of one end of the lever that extend through protrusion holes 43 in support member 36. The protrusion holes are slightly larger than the protrusions allowing the protrusions to rotate within the protrusion holes when the lever is moved. Bracket assembly 35 is used to support the top portion of golf bag 50 and also pivotally mount canopy assembly 54. The support member, pivot arms 82 and levers 49 are preferably made from high strength molded plastic, as for example nylon.

With reference again to FIGS. 2 and 2B, each strap 48 can be used to support the top of golf bag 50 containing golf clubs 52. This can be done by surrounding the top of the golf bag with one of the straps and feeding the strap's free end through a rectangular slot 51 created by the gap between lever 49 and support member 36 when the lever is in an open position. Securing the strap's free end using this method is commonly known and used in the art. The lever is in an open position when the free end of the lever is rotated away from support member 36 (not shown). When the slack in strap 48 has been removed by pushing the free end of the strap into slot 51, lever 49 is rotated to the clamped position with the lever's free end rotated toward support member 36, as shown in FIG. 2, pinching the strap between the inside surface of the lever and the outer surface of support member 36, exerting a clamping force on strap 48, preventing it from loosening. In this way, the top of golf bag 50 is supported by strap 48 and prevented from tipping over. This design is well-known in the art and, therefore, will not be further described. The straps are preferably made from a flexible material, as for example nylon strap material.

Turning now to a more detailed discussion of bracket assembly 35, shown in FIGS. 2, 2A and 2B. Support member 36 is the main structural member of the bracket assembly and serves as a mounting structure for straps 48, levers 49 and pivot arms 82. Support member 36 is an elongated member having two ends with its length corresponding to the width of top 12. The support member is preferably made from a single piece molded plastic part using high strength plastic, as for example nylon, forming a relatively thin-walled structure. The wall thickness and the size of the support member are determined in proportion with the weight of the canopy that it will be supporting. The support member's elongated U-shaped rear surface is designed to help support the top of golf bag 50 stored in bag storage area 24 with extensions 53 on each side curving rearwardly. The extensions are formed as part of the support member. The ends of straps 48 are attached to the support member's front face using bolts or other fastening means. The straps protrude through rectangular strap openings 74 in the support member, as can be seen in FIG. 2. As an alternative construction, the straps can be secured on the rear of the support member or the top or bottom edge of the support member. Mounting the straps is common in the art and will not further be described.

Figure 3:
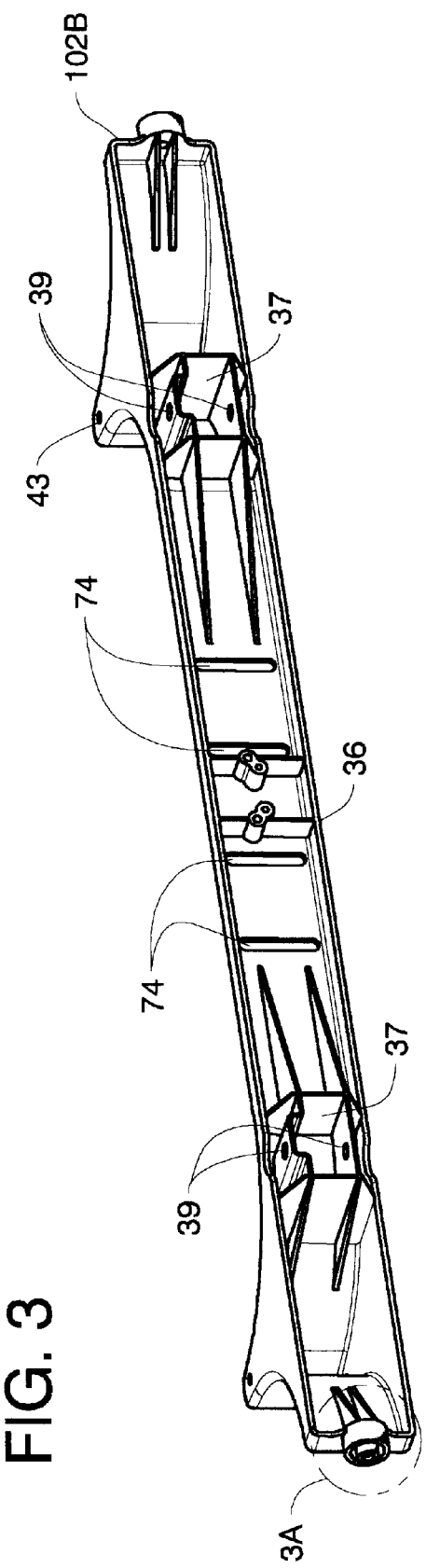
FIG. 3 is a rear perspective view of the support member only.
Figure 3A:
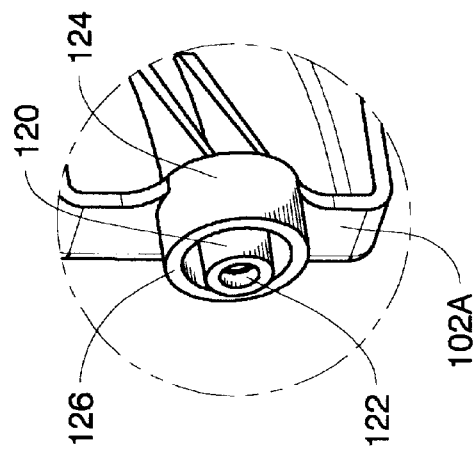

Referring now to FIGS. 3, 3A and 4, support member 36 has two relatively flat and rectangular end faces 102A and 102B. Each end face has a circular boss 120 extending outward from the end face. Surrounding boss 120 is a relatively thin ring 124 that extends outward from the end face a distance less than boss 120, ending in a flat mate surface 126. In the center of boss 120 is a screw hole 122 that has a diameter slightly smaller than the threads on a self-tapping screw 100. As shown in FIG. 4, pivot arm 82 has a planar pivot face 114 recessed into the face of the pivot arm and an axis opening referred to as a pivot hole 112 that is slightly larger than boss 120. The pivot arm is assembled onto support member 36 by assembling pivot hole 112 over boss 120 and assembling a round washer 110 on screw 100 and self-tapping the screw into screw hole 122. In this way, pivot arm 82 is secured onto boss 120 and is pivotally attached to support member 36 forming a type of pivotal attachment mechanism. Boss 120 and ring 124 are formed as part of molded support member 36. The washer distributes the clamp force applied by the screw on the pivot arm to avoid any local wearing with rotation or the pivot arm. The clamp force keeps pivot face 114 on pivot arm 82 in contact with mate surface 126 on the end of ring 124. The friction between these two surfaces resists rotation of pivot arm 82 relative to support member 36. The screw and the washer are preferably made from metal. Both the ring and the boss are formed as an integral part of support member 36.

Figure 6:
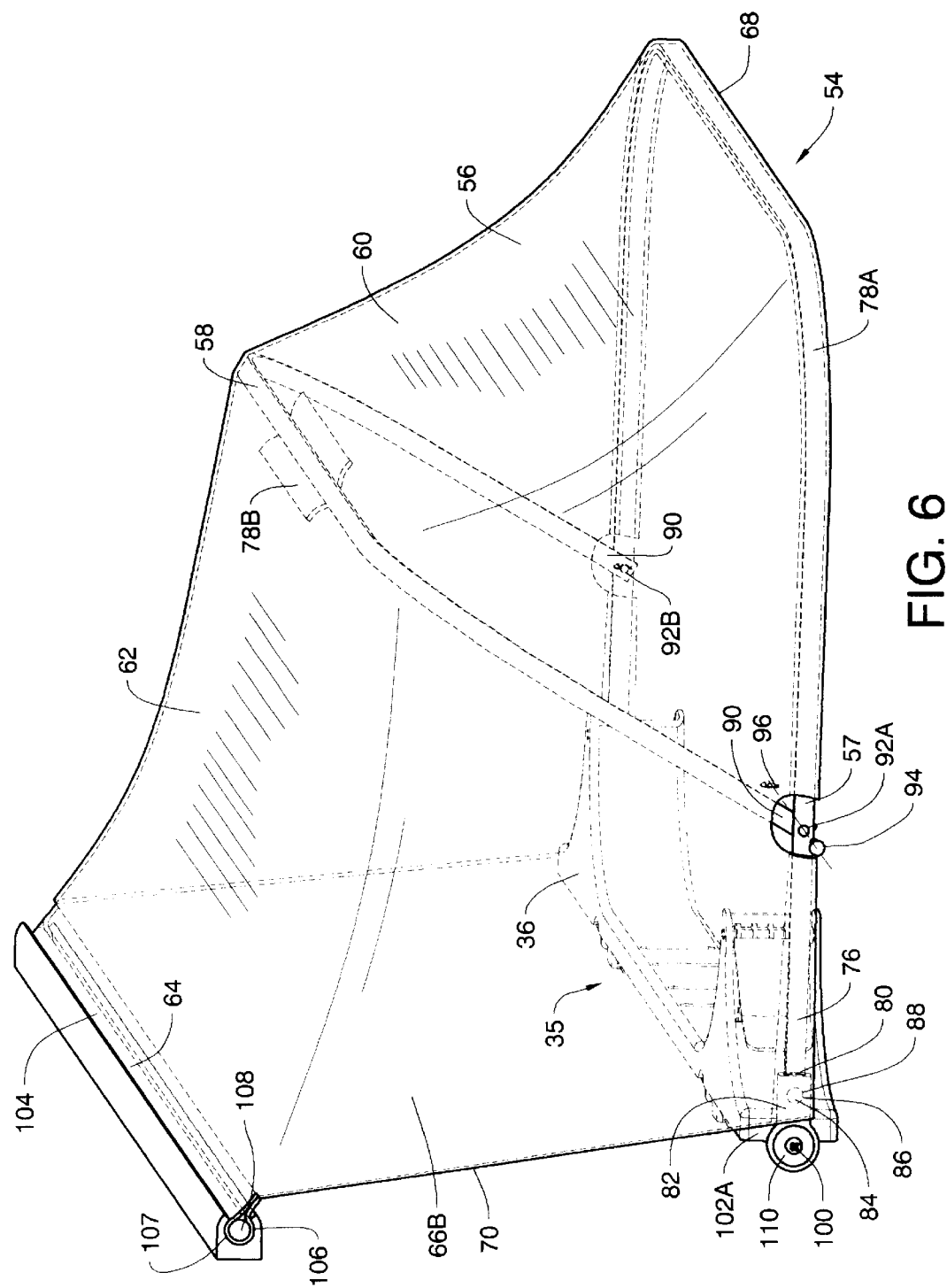
FIG. 6 is a side perspective view of an embodiment of the present invention, a bracket assembly, supporting a canopy without the cart present.

With reference to FIGS. 4 and 6, pivot arm 82 is a single molded body with a generally rounded mount end 116 that transitions to a rectangularly-shaped receiving end 118. The receiving end has a hollowed rectangular socket 80 that is sized to receive a strut end 76 on a strut 57. When the strut end is fully inserted into the socket, a clearance hole 88 in pivot arm 82 aligns with a smaller rivet hole 86 in strut 57. The clearance hole is larger than a rivet 84 and allows rivet 84 to pass through the pivot arm's wall to be inserted into rivet hole 86 on each end of strut 57. The rivet is then fastened within rivet hole 86. The rivet is too large to fit through the opening created by socket 80, therefore, the rivet secures the strut within the socket of the pivot arm. The rivet is preferably made from metal.

With reference to FIGS. 2 and 2A, a channel 40 is attached to a rear face 42 of top 12 using rivets 44. The channel is one continuous piece of extruded aluminum, however, extrude plastic will also work. The channel is elongated having a width about equal to the width of rear face 42 on top 12. The channel has a substantially C-shaped cross section with a rearward opening 46 that extends across the entire width of the channel. The channel is used to secure the top portion of canopy assembly 54 to cart 10. As an alternative, screws or other fastening means may be employed to secure channel 40 to rear face 42 and the channel may have a different cross section from the C-shape described. It should be understood that the channel could be replaced by other fastening methods for securing the top portion of the canopy to the cart, as for example hook and loop fasteners, snaps, zippers and other fastening means.

Turning now to a detailed discussion of a canopy 60, shown in FIGS. 5 and 6. The canopy has a rolled and a sewn top edge 104 forming a rod sleeve 106 that a round rod 108 is slid endwise into until the ends of rod 108 corresponds to the ends of the rod sleeve forming rounded top edge 104. Rod 108 has a length about the same as the length of channel 40. The rod sleeve and the rod are sized to allow them to be inserted as an assembly endwise into the C-shaped cross section of channel 40. With the rod inserted, top edge 104 has a diameter larger than opening 46 in channel 40 preventing the top edge from passing through opening 46, securing the top edge within channel 40. Rod 108 may be constructed of a rigid material as for example plastic, metal or wood.

With reference again to FIG. 5, canopy 60 is made from a thin sheet of flexible water-resistant material, as for example vinyl, that is sewn together. Canopy 60 is defined by a canopy top 62, a canopy back 56 and two generally opposing canopy sides, right side 66A and left side 66B. The canopy has a bottom end 68, a top end 64 and two vertical front edges 70 that define the limits of the canopy. The canopy serves as the rain shield portion of the canopy assembly.

With reference again to FIGS. 5 and 6, strut 57 and a mid-strut 58 provide structural support for the canopy. Strut 57 is a generally U-shaped continuous support with opposite strut ends 76 that have rectangular cross sections. The length of the strut corresponds to bag storage area 24 to ensure that the strut supports canopy 60 over the majority of the bag storage area when the canopy is in the extended position shown. The mid-strut is generally an U-shaped continuous support with opposite mid-strut ends 90 that have rectangular cross sections. The length of the mid-strut corresponds to the amount of clearance desired between the canopy and the golf clubs and the shape of the canopy that it supports. Both the strut and the mid-strut are preferably made of a semi-rigid material like spring steel or a high strength plastic, as for example nylon. Strut 57 passes through a sewn strut sleeve 78A and mid-strut 58 passes through a sewn mid-strut sleeve 78B in the canopy to locate them in the desired position within canopy 60. In this way, the canopy is attached to strut 57 and mid-strut 58. As an alternative the strut and mid-strut could be attached to the canopy using other fastening methods as for example hook and loop fasteners, snaps or other fastening means. Strut 57 has pin holes 92A exposed by a canopy cutout 98 that aligns with pin holes 92B in mid-strut 58 to allow pins 94 to pass through, pivotally connecting the strut and mid-strut together. Lock pins 96 are assembled onto the ends of pins 94 to secure the pins in position. In this way, the mid-strut is free to pivot about pins 94 relative to strut 57. Strut 57 and mid-strut 58 together makeup the frame structure for supporting canopy 60. Both pin 94 and lock pin 96 are preferably made from metal, however, high strength plastic will also work.

With reference again to FIGS. 5 and 6, canopy assembly 54 is attached to cart 10 and is extended to protect golf bag 50 and golf clubs 52 from adverse weather conditions like rainfall. In the extended position shown, canopy 60 is taunt from within channel 40 and stretches over midstrut 58 and down over strut 57. Therefore, channel 40, mid-strut 58 and strut 57 cooperate to support canopy 60. In this way, canopy 60 covers bag storage area 24 and remains in this position due to the weight of the canopy, strut 57 and mid-strut 58.

Figure 7:
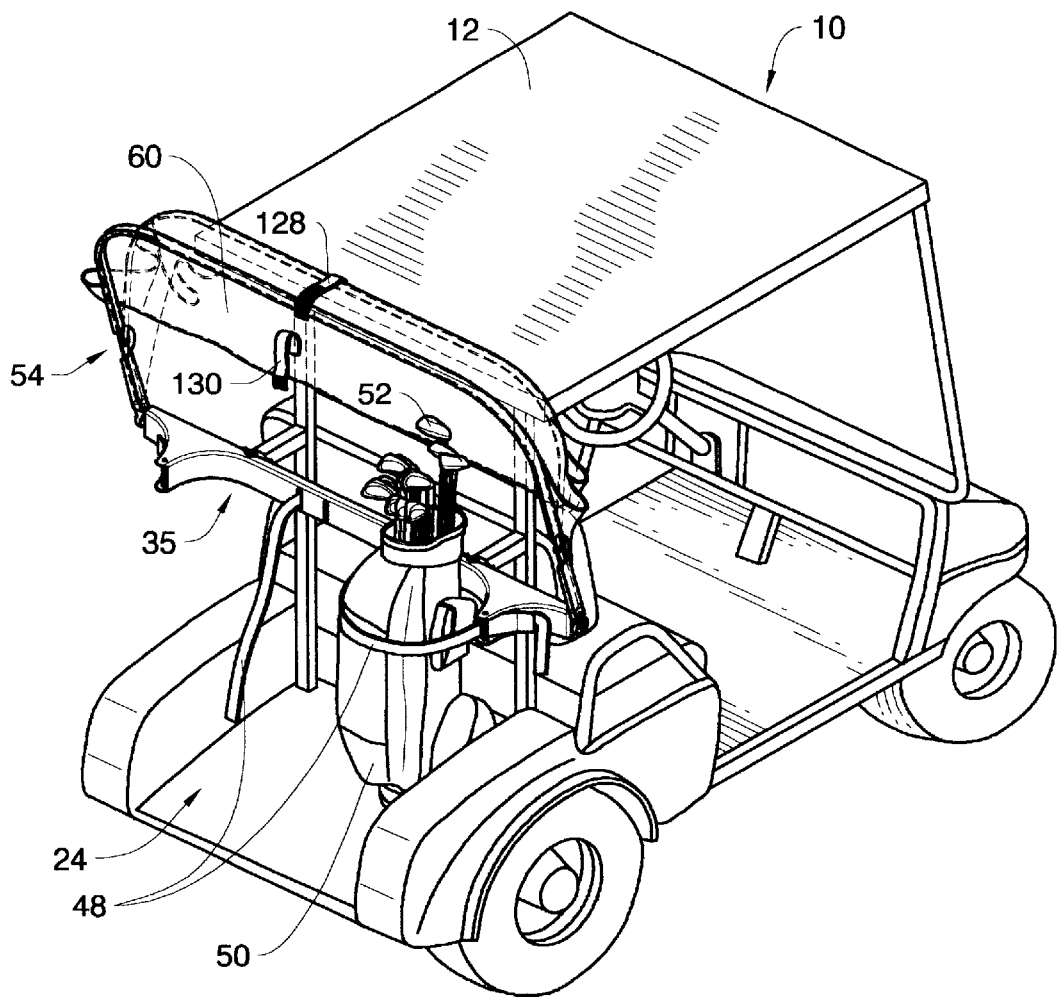
FIG. 7 is a perspective view of the cart with an embodiment of the present invention attached and the canopy folded up to allow access to the golf clubs.

With reference to FIG. 7, canopy assembly 54 is attached to cart 10 and is shown in a folded up position to allow access to golf bag 50 and golf clubs 52. Canopy 60 is folded up from the extended position, as shown in FIG. 5, by gripping the bottom of canopy 60 near strut 57 and lifting the strut upwardly, toward the back of top 12. The moment force created from this lifting action causes pivot arms 82 to rotate around bosses 120 on support member 36. Strut 57 rotates relative to mid-strut 58 around pins 94. At approximately the halfway point of folding up the canopy, strut 57 contacts mid-strut 58 with the canopy material folded in between them and begins to rotate the mid-strut with the strut upwardly toward the back of top 12. When the lifting action is completed, as shown in FIG. 7, both strut 57 and mid-strut 58 are substantially vertical and the user may release the canopy. The friction between mate surfaces 126 on support member 36 and pivot face 114 on each pivot arm 82 prevents the canopy from falling back into the extended position. Therefore, the canopy is held in the folded position, as shown in FIG. 7, by the friction between mate surface 126 and pivot face 114.

If the weather conditions improve and the player wishes to have the cover retained in the folded position while driving the cart, he or she may choose to fasten the cover in this position using the hook and loop fastening method, shown in FIG. 7. A rectangular loop strap 128 is sewn to the canopy on the outer face near top end 64 and is wrapped over the folded canopy and attached to a corresponding rectangular hook strap 130 that is sewn to the inside face of the canopy near top end 64. The player may extend the canopy by separating the loop strap from the hook strap and pulling bottom end 68 of canopy 60 near strut 57 downwardly and toward the back of the cart. This will extend the cover over bag storage area 24, as shown in FIG. 5.

Figure 8:
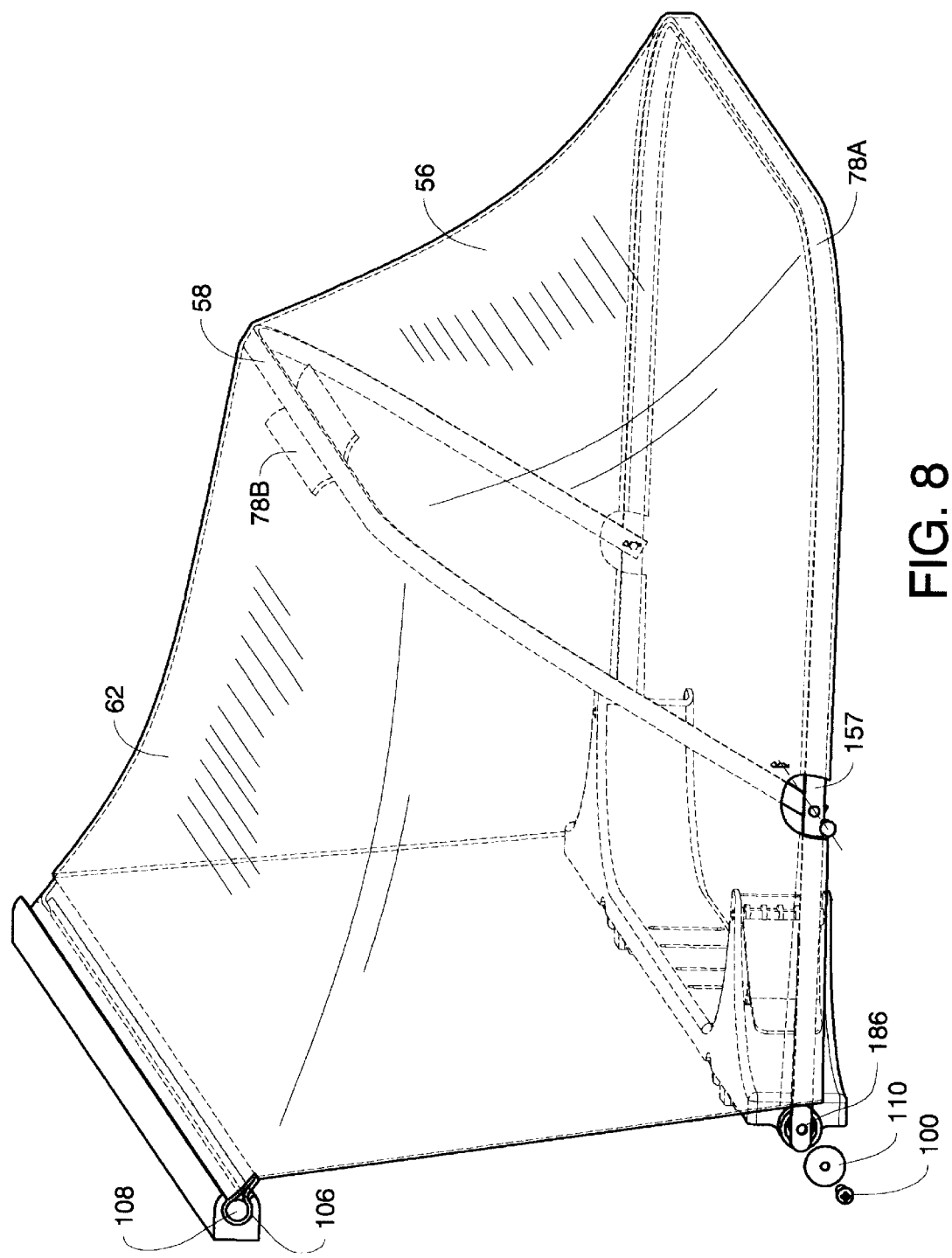
FIG. 8 is a side perspective view of a second alternative embodiment of the present invention, a modified bracket assembly, supporting a canopy without the cart present.

In a second embodiment of this invention, shown in FIG. 8, pivot arms 82 and rivet holes 86 used in the first embodiment, are eliminated. Modified pivot holes 1.86, in the ends of a modified strut 157, are assembled directly onto bosses 120. The modified pivot holes have a diameter slightly larger than boss 120. In this embodiment, modified strut 157 is pivotally attached directly to support member 36 in the same way as pivot arms 82, as previously described, using screws 100 and washers 110.

Figure 9:
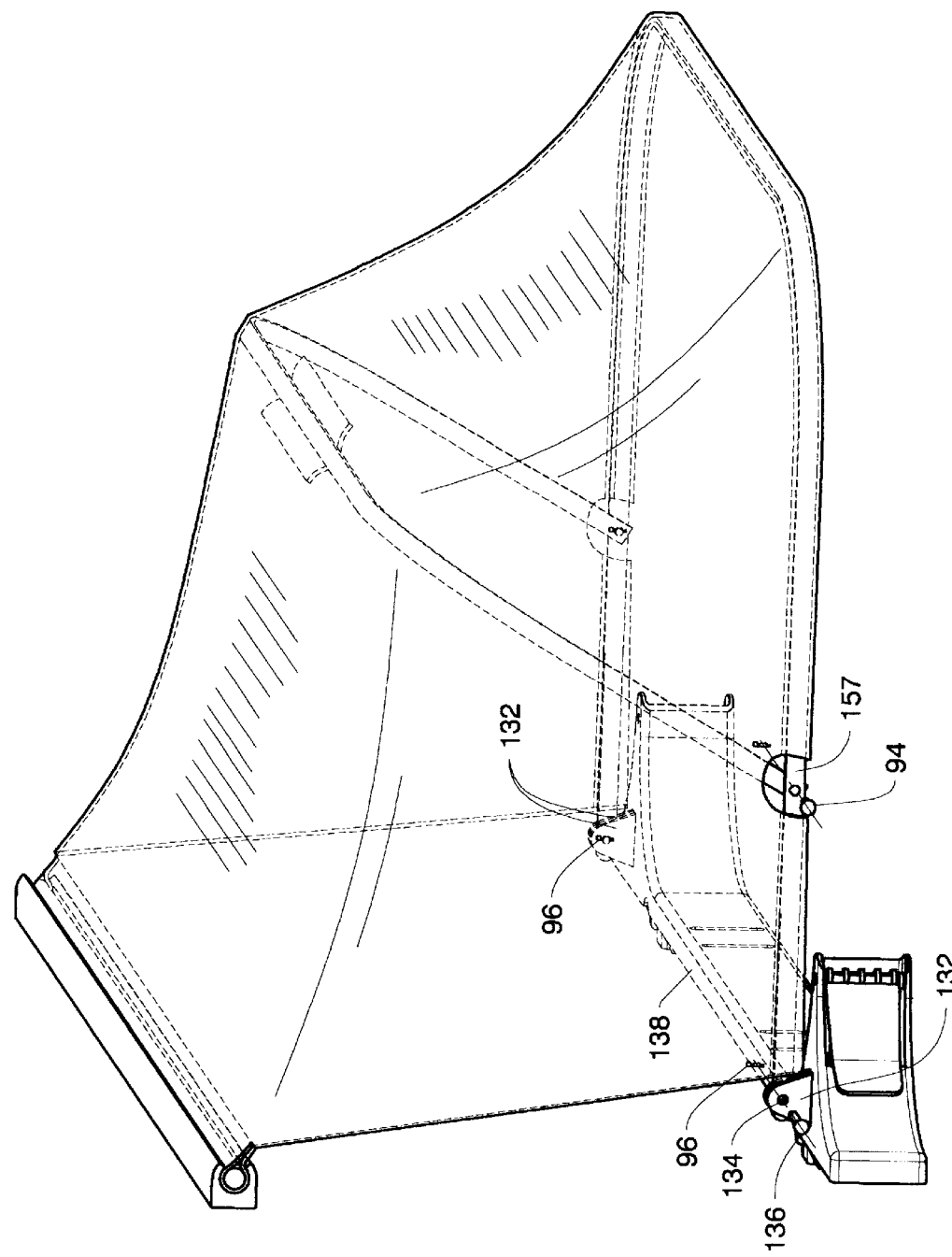
FIG. 9 is a side perspective view of a third alternative embodiment of the present invention, a bracket assembly, supporting a canopy without the cart present.

A third embodiment of this invention is shown in FIG. 9. Modified strut 157 is pivotally mounted between two pairs of planar flanges 132 that extend from the top of a modified support member 138. The modified strut is positioned so that pivot holes 186 align with flange holes 134 and allow a fastener such as a strut pin 136 to be inserted through each pair of flanges 132 and through the modified pivot hole in the modified strut. Lock pin 96 is used to secure the strut pin in position. Therefore, the modified strut is pivotally attached to the modified support member without the need for screws or washers. This embodiment has the additional advantage of enabling the user to quickly detach and attach the modified strut to the modified support member. Flanges 132 are an integral part of the molded, modified support member and, therefore, are preferably made from high strength plastic, as for example nylon. The strut pin is preferably made of rigid material like nylon or steel.

Figure 10:
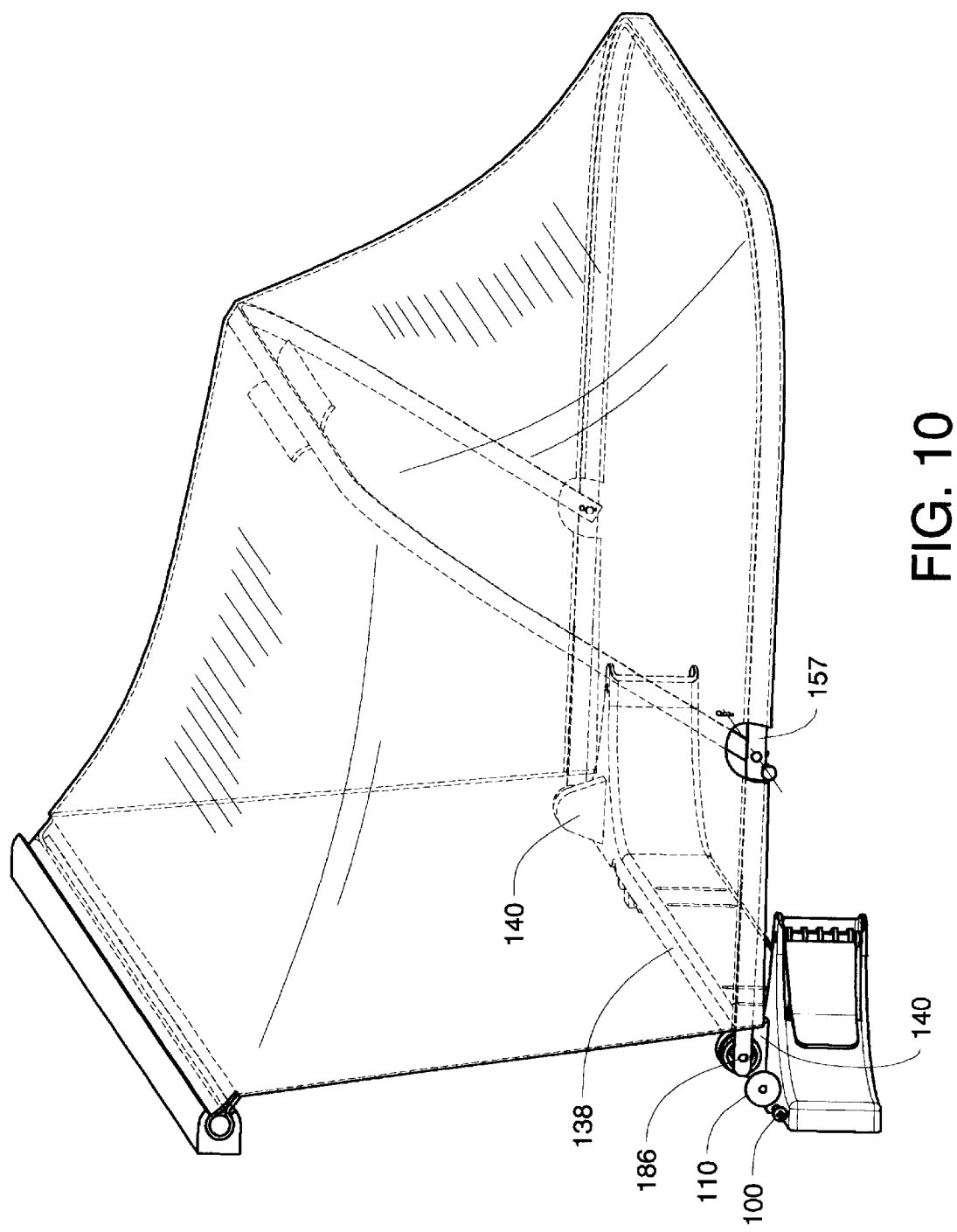
FIG. 10 is a side perspective view of a fourth alternative embodiment of the present invention, a bracket assembly, supporting a canopy without the cart present.

A fourth embodiment of this invention is shown in FIG. 10. Modified pivot holes 186, in the ends of modified strut 157, are assembled directly onto bosses 120 (not shown in this figure) extending from modified flanges 140 that extend from the top surface of modified support member 138. Both the modified flanges and the bosses are integrally formed as part of the modified support member. The modified pivot holes have a diameter slightly larger than boss 120. In this embodiment, modified strut 157 is pivotally attached directly to modified support member 138 in the same way as pivot arms 82, as previously described, using fasteners such as screws 100 and washers 110.

Figure 11:
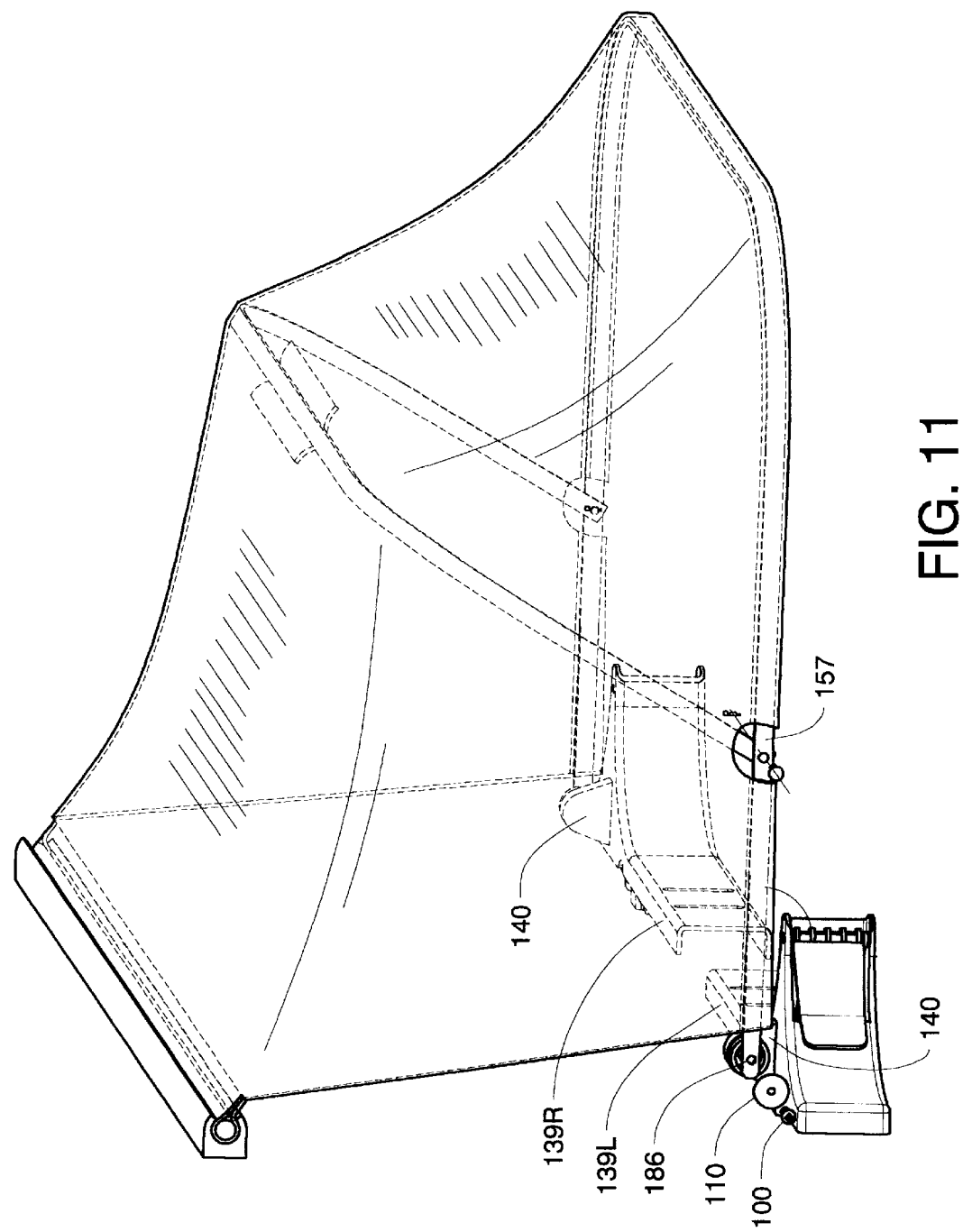
FIG. 11 is a side perspective view of a fifth alternative embodiment of the present invention, a bracket assembly, supporting a canopy without the cart present.

A fifth embodiment of this invention is shown in FIG. 11. The modified support member has been replaced by a right support member 139R and a left support member 139L. The right and left support members perform the same function as the modified support member. The right and left support members mount to the cart's frame in the same way as previously explain for the support member in the first embodiment.

Conclusions, Ramifications, and Scope of Invention

Accordingly, one skilled in the art will recognize that the canopy and golf bag support bracket assembly of this invention can be used for securing golf bags located in the rear of the cart and pivotally mounting the struts of a canopy secured to the rear of the cart.

Although the description above contains many specificities, these should not be construed as limiting the scope of the invention but as merely providing illustrations of some of the presently preferred embodiments of this invention. For example, the plastic molded support member could be replaced with a stamped steel or wood support member; the support member could have a different shape or be made of an assembly of individual section or two individual pieces; bolts used to mount the bracket assembly could be replaced by screws, snaps, pins or other fastening means; the mount pockets on the support member that accept the cart's frame extensions could be replaced with flanges or other receiving means or eliminated completely; the mount pockets could also be replaced by individual structural members that correspond with the bracket assembly and the frame of the cart; the strap openings could be eliminate by mounting the straps directly to the face of the support member; the straps for surrounding the tops of the golf bags could be replaced with bands or other coupling means; the levers on the support member that receive the strap ends could be replaced with hook and loop strips, buckles, or other fastening means; the screw fastening the pivot arms onto the boss on the support member could be replaced by snap fitting the pivot hole on the pivot arm over a corresponding boss; one pivot arm could be removed by only attaching one end of the strut to the support member; the mid-strut could also be directly attached to the support member or to additional pivot arms instead of attaching to the mid section of strut; both the strut and the mid-strut do not have to pass through sewn channels in the canopy, they could be attached using other fastening means like hook and loop straps; the channel mounted on the back of the rear face of the top could be replaced by another type of fastening means to connect the canopy's top edge to the cart's top as for example a hook strip attached to the top and a loop strip attached to the top edge of the canopy; the rod sleeve and rod could be eliminated by rolling and sewing the top end of the canopy; the support member's extensions could be reshaped or eliminated and the strap alone could hold the bags, etc.

Thus the scope of the invention should be determined by the appended claims and their legal equivalents, rather than by the examples given.

What is claimed is:

1. A bracket assembly for supporting golf bags on a golf cart and for supporting a rearwardly extending canopy assembly having a canopy and a canopy frame structure, the canopy frame structure having at least two ends, the golf cart having a body, a frame, a passenger compartment and a golf bag storage area located rearwardly of the passenger compartment, said bracket assembly comprising:

a support member, said support member includes a mounting feature for connecting to the frame of the golf cart;

means for pivotally connecting the canopy frame structure to said support member when the canopy assembly is installed on the golf cart; and a coupling member for securing the upper portion of a golf bag standing upright in the golf bag storage area to said support member.

2. The bracket assembly according to claim 1 wherein said means for pivotally connecting the canopy frame structure to said support member includes pivotally securing the ends of the canopy frame structure to said support member.

3. The bracket assembly according to claim 2 further including at least one fastener for pivotally connecting the ends of the canopy frame structure to said support member.

4. The bracket assembly according to claim 1 wherein said means for pivotally connecting the canopy frame structure to said support member includes at least one pivot arm pivotally secured to each end of said support member.

5. The bracket assembly according to claim 4 wherein said means for connecting the ends of the canopy frame structure to said pivot arm includes at least one socket in said pivot arm for receiving the ends of the canopy frame structure.

6. The bracket assembly according to claim 4 wherein said pivot arm includes a pivot face in contact with a mating surface on said support member, whereby the friction between said pivot face and said mating surface resists rotation of said pivot arm relative to said support member.

7. The bracket assembly according to claim 1 wherein said means for pivotally connecting the canopy frame structure to said support member comprises:

bosses extending from each end of said support member; and pivot arms having axis openings sized to receive said bosses, wherein said pivot arms are mounted onto said bosses of said support member.

8. A bracket assembly according to claim 1 wherein said mounting means for pivotally connecting the canopy frame structure to said support means includes at least one flange extending from the top of said support means, said flange having connecting means for pivotally connecting the canopy frame structure to said flange.

9. A bracket assembly according to claim 8, wherein said connecting means for pivotally connecting the canopy frame structure to said flange comprises:

an axis hole in said flange for pivotally mounting the canopy frame structure;

openings near the ends of the canopy frame structure, wherein said openings near the ends of the canopy frame structure are aligned with said axis hole in said flange; and at least one fastener extending through the aligned axis hole in said flange and through the corresponding openings in the ends of the canopy frame structure, said fastener being secured within said flanges.

10. A bracket assembly according to claim 8 wherein said connecting means for pivotally connecting the canopy frame structure to said flange comprises:

a boss extending off of each side of said flange for pivotally mounting the canopy frame structure; and openings near the ends of the canopy frame structure, wherein said openings are mounted onto said bosses on said flange.

11. A bracket assembly according to claim 8 wherein said connecting means for pivotally connecting the canopy frame structure to said flange comprises:

at least one pivot arm pivotally secured to said flange for pivotally connecting the canopy frame structure to said support means; and means for connecting said pivot arm to the ends of the canopy frame structure.

12. The bracket assembly according to claim 1 wherein said support member is made of high strength plastic.

13. The bracket assembly according to claim 1 wherein said coupling member includes at least two extensions protruding rearwardly from said support member for supporting the golf bag, wherein said extensions contact the golf bag on at least one face.

14. The bracket assembly according to claim 1 wherein said coupling member comprises:

at least one strap having a first end and a second end, said first end is mounted to said support member and said second end is free; and at least one strap securing mechanism attached to said support member for releasably securing said second end of said strap to said support member, whereby said strap surrounds the upper portion of the golf bag and is secured tightly in this position by the strap securing mechanism.

15. The bracket assembly according to claim 1 wherein said mounting feature comprises:

at least one mount pocket formed as part of said support member for attachment to the frame of the golf cart; and at least one fastener, whereby a portion of the frame of the golf cart can be positioned within said mount pocket and said fastener can pass through corresponding openings in said pocket and the frame of the golf cart to secure said support member onto the frame of the golf cart.

16. A bracket assembly for supporting golf bags on a golf cart and for supporting a rearwardly extending canopy assembly having a canopy and a canopy frame structure, the canopy frame structure having at least two attachment points, the golf cart having a body, a frame, a passenger compartment and a golf bag storage area located rearwardly of the passenger compartment, said bracket assembly comprising:

at least one support member having at least one rearwardly extending extension to support the upper portion of golf bags resting in the golf bag storage area, wherein said extension contacts the golf bag on at least one face when the golf bags are stored in the golf bag storage area;

at least one pivotal attachment for pivotally connecting the canopy frame structure to said support member when the canopy assembly is installed on the golf cart;

at least one coupling member attached to said support member for securing the upper portion of a golf bag standing upright in the golf bag storage area; and at least one mounting feature connected to said support member, wherein said mounting feature can be used to connect said support member to the frame of the golf cart.

17. The bracket assembly according to claim 16 wherein said pivotal attachment connecting said support member to the canopy frame structure includes using a fastener to secure at least one attachment point of the canopy frame structure to said support member.

18. The bracket assembly according to claim 16 wherein said pivotal attachment connecting said support member to the canopy frame structure comprises:

at least one pivot arm pivotally secured to said support member; and means for connecting at least one attachment point of the canopy frame structure to said pivot arm.

19. A bracket assembly for supporting golf bags on a golf cart and for supporting a rearwardly extending canopy assembly having a canopy and a canopy frame structure, the canopy frame structure having at least two attachment points, the golf cart having a body, a frame including rearwardly protruding frame extensions, a passenger compartment, and a golf bag storage area located rearwardly of the passenger compartment, said bracket assembly comprising:

at least one elongated support member having at least two ends;

at least one pivotal attachment for pivotally connecting the canopy frame structure to said support member when the canopy assembly is installed on the golf cart;

at least one strap attached to said support member for securing the upper portion of a golf bag standing upright in the golf bag storage area; and at least one mounting feature on said support member, said mounting feature is used to connect to the rearwardly protruding frame extensions of the golf cart.

20. A bracket assembly for supporting golf bags on a golf cart and for supporting a rearwardly extending canopy assembly attached to a golf cart, the golf cart having a body, a frame, a seating compartment, a golf bag compartment located rearwardly of the seating compartment, a top assembly including a top positioned over the seating compartment and additionally including front and rear laterally spaced apart and vertically extending frame members supporting the top, the canopy assembly being moveable between an extended first position where it at least partially covers the golf bag compartment and a folded second position where it is folded out of the way to allow access to the golf bag compartment, said bracket assembly comprising:

a canopy having a top edge and a bottom edge;

means for connecting said top edge of said canopy to the upper rear portion of the top assembly;

a frame structure for supporting said canopy;

attachment means for connecting said canopy to said frame structure;

support means for supporting said bracket assembly; mounting means for pivotally connecting said frame structure supporting said canopy to said support means;

means for securing the upper portion of a golf bag standing upright in the golf bag compartment to said support means; and attachment means for connecting said support means to the frame of the golf cart.

21. A bracket assembly according to claim 20 wherein means for securing the upper portion of a golf bag standing upright in the golf bag compartment to said support means comprises:

at least one strap having a first end and a second end, said first end is mounted onto said support means and said second end is free; and at least one strap securing mechanism attached to said support means for releasably securing said second end of said strap to said support means, whereby said strap can be used to surround the upper portion of the golf bag standing in the golf bag compartment to secure the bag to said support means.

22. A bracket assembly for supporting golf bags on a golf cart and for supporting a rearwardly extending canopy assembly attached to a golf cart, the golf cart having a body, a frame, a seating compartment, a golf bag compartment located rearwardly of the seating compartment, a top assembly including a top positioned over the seating compartment and additionally including front and rear laterally spaced apart and vertically extending frame members supporting the top, the canopy assembly being moveable between an extended first position where it at least partially covers the golf bag compartment and a folded second position where it is folded out of the way to allow access to the golf bag compartment, said bracket assembly comprising:

a canopy having a top edge and a bottom edge;

means for connecting said top edge of said canopy to the upper rear portion of the top assembly;

a frame structure for supporting said canopy;

attachment means for connecting said canopy to said frame structure;

at least one elongated support member having at least two ends;

at least one pivotal attachment mechanism pivotally connecting said frame structure supporting said canopy to said support member;

at least one strap attached to said support member for securing the upper portion of a golf bag standing upright in the golf bag compartment; and at least one mounting feature on said support member used to connect to the frame of the golf cart.

\* \* \* \* \*